(12) United States Patent
Kiriyama et al.

(10) Patent No.: US 7,274,723 B2
(45) Date of Patent: Sep. 25, 2007

(54) METHOD FOR AMPLIFYING A SOLID-STATE LASER

(75) Inventors: Hiromitsu Kiriyama, Kyoto (JP); Koichi Yamakawa, Kyoto (JP)

(73) Assignee: Japan Atomic Energy Research Institute, Kashiwa (JP)

( * ) Notice: Subject to any disclaimer, the term of this patent is extended or adjusted under 35 U.S.C. 154(b) by 157 days.

(21) Appl. No.: 10/927,506

(22) Filed: Aug. 27, 2004

(65) Prior Publication Data

US 2005/0195880 A1    Sep. 8, 2005

(30) Foreign Application Priority Data

Mar. 4, 2004    (JP) .............................. 2004-060438

(51) Int. Cl.
*H01S 3/091*    (2006.01)
(52) U.S. Cl. ............................ 372/70; 372/71; 372/72; 372/75; 372/99; 372/106
(58) Field of Classification Search ................... 372/70, 372/71, 72, 75, 99, 106
See application file for complete search history.

(56) References Cited

U.S. PATENT DOCUMENTS

| | | | | |
|---|---|---|---|---|
| 5,872,804 A | * | 2/1999 | Kan et al. ...................... | 372/93 |
| 5,974,060 A | * | 10/1999 | Byren et al. .................. | 372/19 |
| 6,096,598 A | | 8/2000 | Furukawa et al. | |
| 6,483,859 B1 | * | 11/2002 | Drake, Jr. ..................... | 372/25 |

* cited by examiner

*Primary Examiner*—Minsun Oh Harvey
*Assistant Examiner*—Tod T. Van Roy

(57) ABSTRACT

Conventionally, a laser beam is amplified by making a single pass through an amplifier but the laser beam emitted from the oscillator generally has low energy, so the energy stored in the amplifier cannot be fully extracted and only low laser output power and overall efficiency result.

According to the method of the invention for amplifying a solid-state laser, the laser beam is passed through the amplifier multiple times and with spatial uniformity so as to achieve efficient extraction of the energy stored in the amplifier and the thermally induced distortion of the laser beam can be compensated by the single amplifier.

8 Claims, 6 Drawing Sheets

Fig. 6
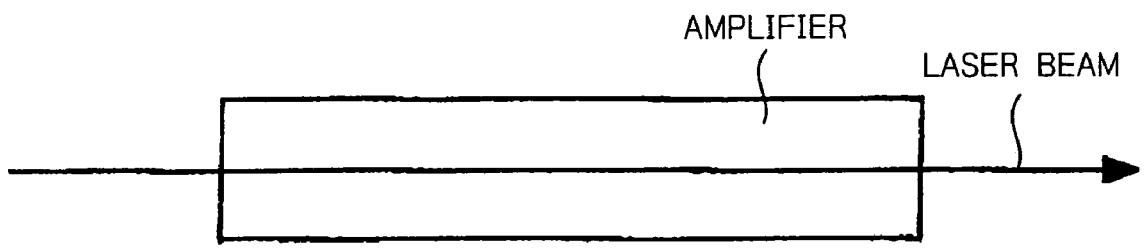
(a) OPTICAL PATH OF LASER BEAM THROUGH AN ORDINARY AMPLIFIER
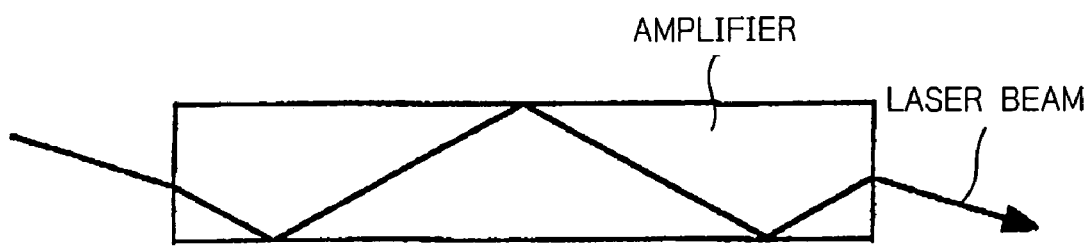
(b) OPTICAL PATH OF LASER BEAM THROUGH A ZIGZAG SLAB AMPLIFIER

METHOD FOR AMPLIFYING A SOLID-STATE LASER

BACKGROUND OF THE INVENTION

This invention relates to a method for amplifying a solid-state laser by passing a laser beam through an amplifier several times while compensating for the thermal distortion in the laser beam by means of bending mirrors, polarizers, a Faraday rotator and a phase conjugate mirror in combination with the amplifier.

Conventionally, a laser beam is amplified by making a single pass through an amplifier (J. L. Emmett et al., Lawrence Livermore Laboratory, No. UCRL-52863, April (1980)). The conventional method of laser beam amplification is shown schematically in FIG. 1, in which the laser beam is indicated by 1 and the amplifier by 2.

The laser beam 1 emitted from the oscillator generally has low energy and the single-pass system shown in FIG. 1 is unable to exhibit a saturation behavior in amplification; therefore, the energy stored in the amplifier 2 cannot be fully extracted and only low laser output power and overall efficiency result.

An object, therefore, of the present invention is to provide an efficient method for laser beam amplification that can produce an output of high quality by employing bending mirrors, polarizers, a phase conjugate mirror, etc. in combination with the amplifier.

SUMMARY OF THE INVENTION

This object of the invention can be attained by a method of solid-state laser amplification which is characterized in that the laser beam 1 is passed through the amplifier 2 multiple times and with spatial uniformity so as to achieve efficient extraction of the energy stored in the amplifier 2 and that the thermally induced distortion of the laser beam 1 can be compensated by the single amplifier 2.

For example, as shown in FIG. 4, a second bending mirror $3_2$, a first polarizer $4_1$, a second polarizer $4_2$ and a phase conjugate mirror 6 are provided on the side of the amplifier 2 which faces the laser oscillator whereas a Faraday rotator 5, a first bending mirror $3_1$, a third bending mirror $3_3$ and a fourth bending mirror $3_4$ are provided on the opposite side of the amplifier 2. The laser beam from the oscillator passes through the amplifier 2 to be reflected by the first bending mirror $3_1$; the reflected laser beam passes through the amplifier 2 and the first polarizer $4_1$ to be reflected by the second bending mirror $3_2$; the reflected laser beam passes through the amplifier 2 and the Faraday rotator 5 to be reflected by the third bending mirror $3_3$; the reflected laser beam passes through the rotator 5 and the amplifier 2 to be reflected by the phase conjugate mirror 6; the reflected laser beam makes another pass through the amplifier 2 and the rotator 5 to be reflected by the fourth bending mirror $3_4$; the reflected laser beam makes another pass through the rotator 5 and the amplifier 2 to be picked up from the second polarizer $4_2$. The thermal distortion in the laser beam that is caused by thermal birefringence (upsetting of the state of laser beam polarization on account of heat generation in the amplifier) is compensated by means of the Faraday rotator and the thermal distortion in the laser beam that is caused by thermal lensing (the laser beam becomes no longer parallel and is subject to more-than-necessary focusing) is compensated by means of the phase conjugate mirror. As a result, a laser beam of high quality can be outputted featuring good focusing performance.

By using the amplification method of the invention, the energy stored in the amplifier can be extracted efficiently to yield a laser beam of high output power. In addition, the thermal distortion is effectively compensated to output a laser beam of high quality that features good focusing performance.

BRIEF DESCRIPTION OF THE DRAWINGS

FIG. 6 shows the optical path of a laser beam in a zigzag slab amplifier as contrasted with the optical path in the ordinary amplifier.

1 . . . laser beam
2 . . . amplifier
$3_1$ . . . bending mirror
$3_2$ . . . bending mirror
$3_3$ . . . bending mirror
$3_4$ . . . bending mirror
$4_1$ . . . polarizer
$4_2$ . . . polarizer
5 . . . Faraday rotator
6 . . . phase conjugate mirror

DETAILED DESCRIPTION OF THE INVENTION

Figure 2:
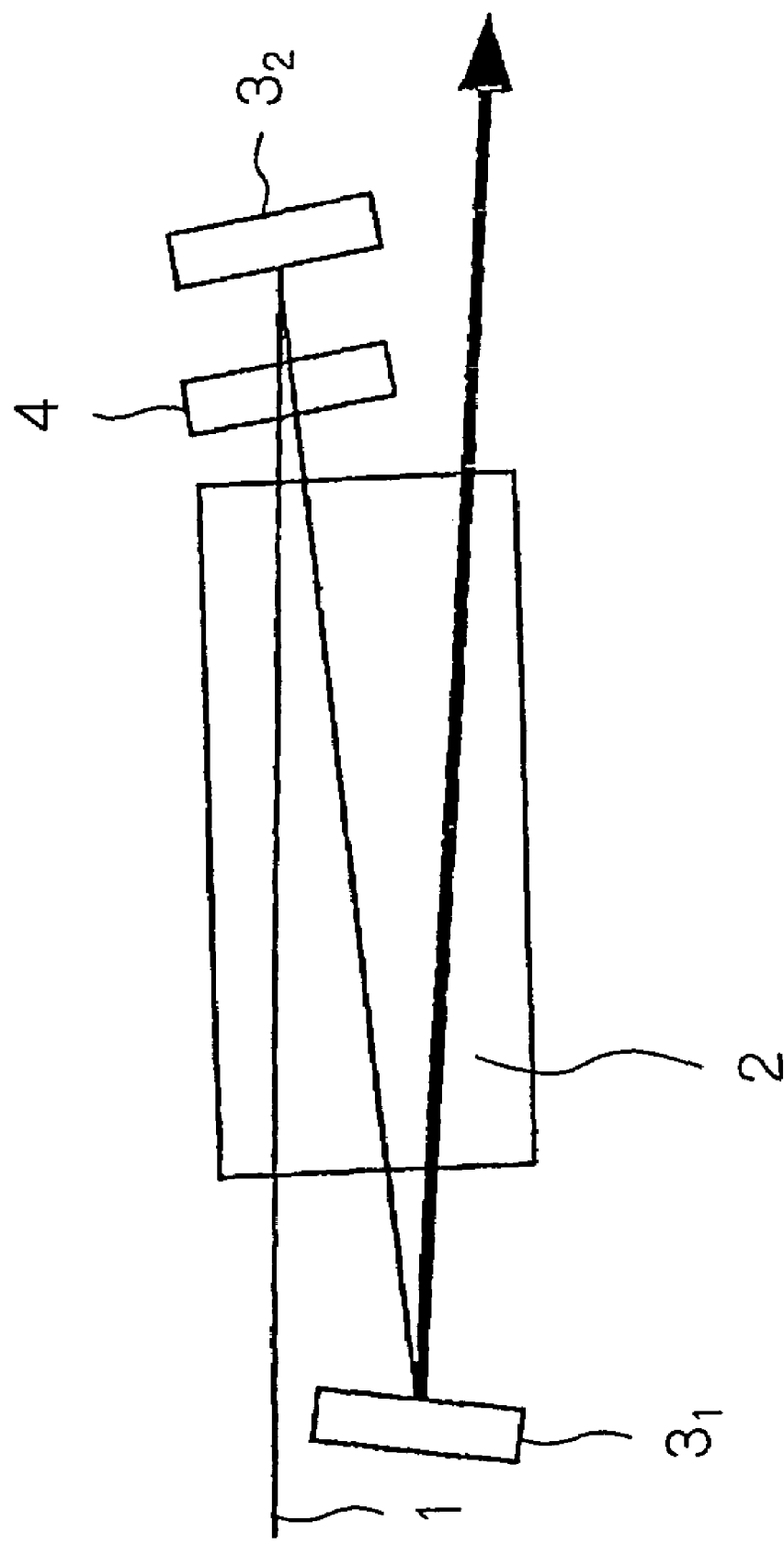
FIG. 2 shows in concept an optical path for laser beam amplification.

As shown in FIG. 2, the method of the invention is characterized in that bending mirrors 3 and a polarizer 4 are provided in the optical path of the laser beam 1 so that the rotation of polarization is utilized to ensure that the laser beam 1 is passed through the amplifier 2 multiple times and uniformly. As a result, the energy stored in the amplifier 2 can be efficiently extracted with low input laser energy and yet high amplification gain is obtained.

To be more specific, a first bending mirror $3_1$ is provided on the side of the amplifier 2 which faces the laser oscillator and a polarizer 4 and a second bending mirror $3_2$ are provided on the other side; the laser beam 1 from the oscillator is passed through the amplifier 2 and the polarizer 4 to be reflected by the second bending mirror $3_2$; the reflected laser beam makes another pass through the polarizer 4 and the amplifier 2 to be reflected by the first bending mirror $3_1$; the reflected laser beam is taken up as an output from the amplifier 2. As a result, there is obtained a laser beam that has been subjected to the rotation of polarization in the polarizer 4 and which has made three passes through the amplifier 2 to acquire higher energy.

Figure 3:
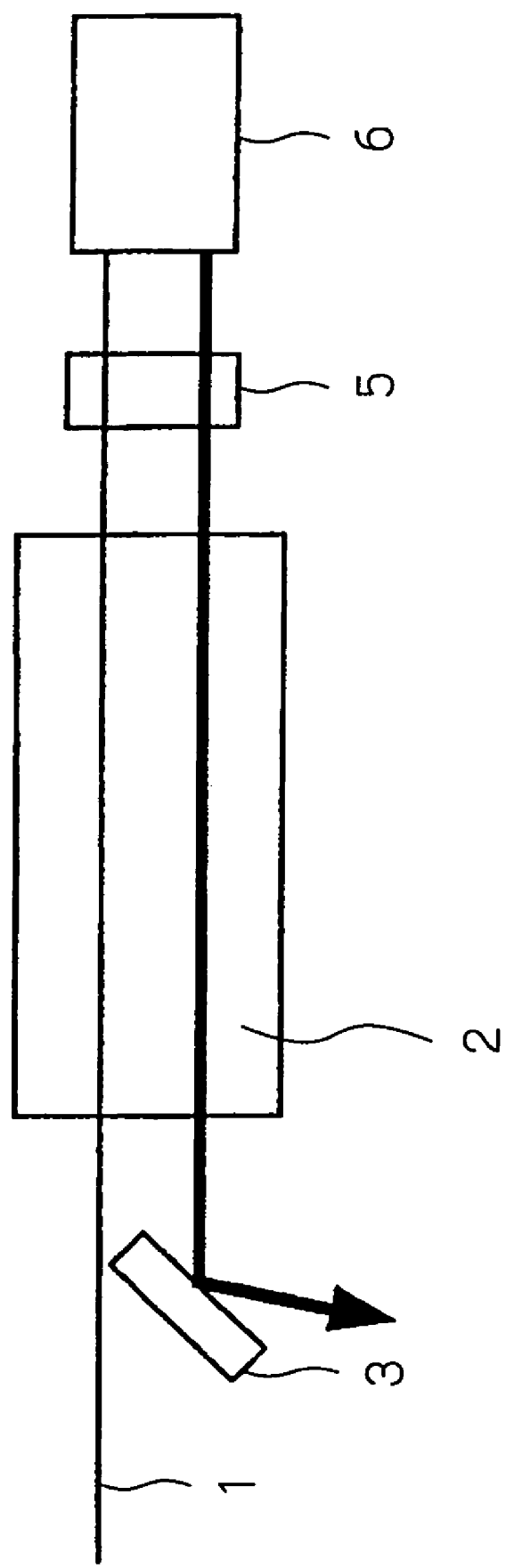
FIG. 3 shows in concept how to compensate for the thermal distortion of an amplified laser beam.

As shown in FIG. 3, the method of the invention is also characterized in that the thermal distortion (thermal lensing and thermal birefringence) of the laser beam 1 due to heat generation in the amplifier 2 can be compensated by using a Faraday rotator 5 and a phase conjugate mirror 6. As a result, a laser beam of high quality can be obtained that features good focusing performance.

To be more specific, a bending mirror 3 is provided on the side of the amplifier 2 which faces the laser oscillator and a Faraday rotator 5 and a phase conjugate mirror 6 are provided on the other side; the laser beam 1 from the oscillator is passed through the amplifier 2 and the rotator 5 to be reflected by the conjugated mirror 6; the reflected laser beam makes another pass through the rotator 5 and the amplifier 2 to be reflected outward by the bending mirror 3; the reflected laser beam is picked up as an output from the amplifier 2. The Faraday rotator 5 and the phase conjugate mirror 6 effectively compensate for the thermal distortion of the laser beam caused by heat generation in the amplifier 2 and, as a result, a laser beam of high quality is obtained that features good focusing performance.

Figure 1:
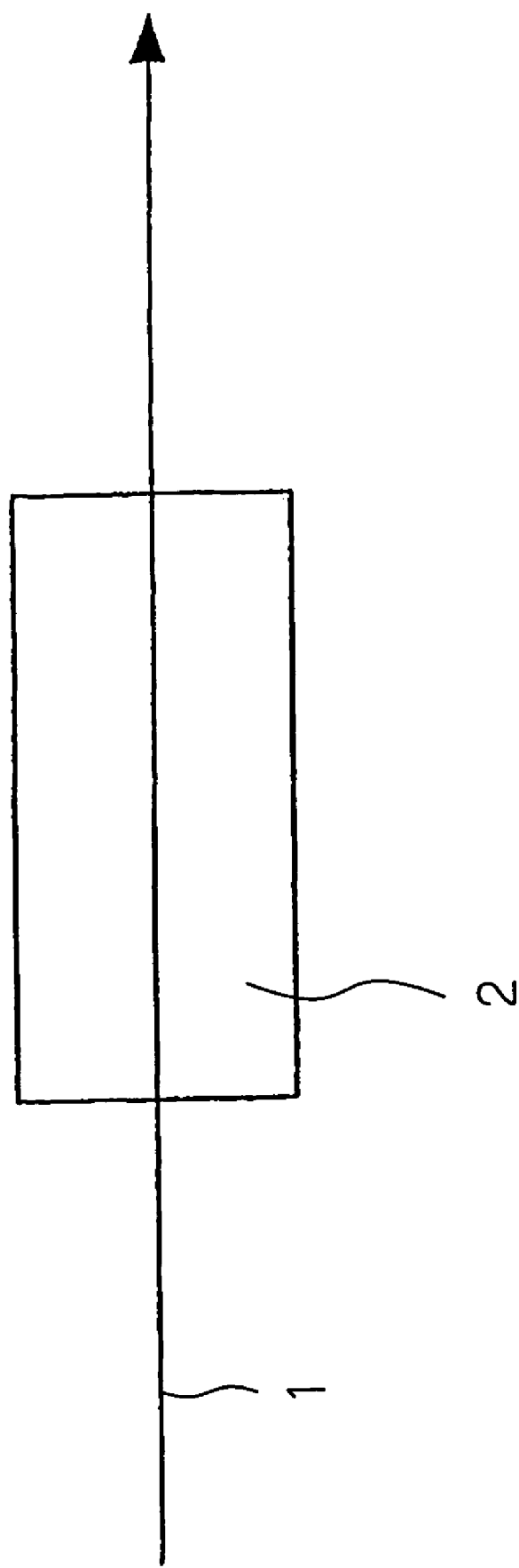
FIG. 1 shows schematically a conventional method of laser beam amplification.
Figure 4:
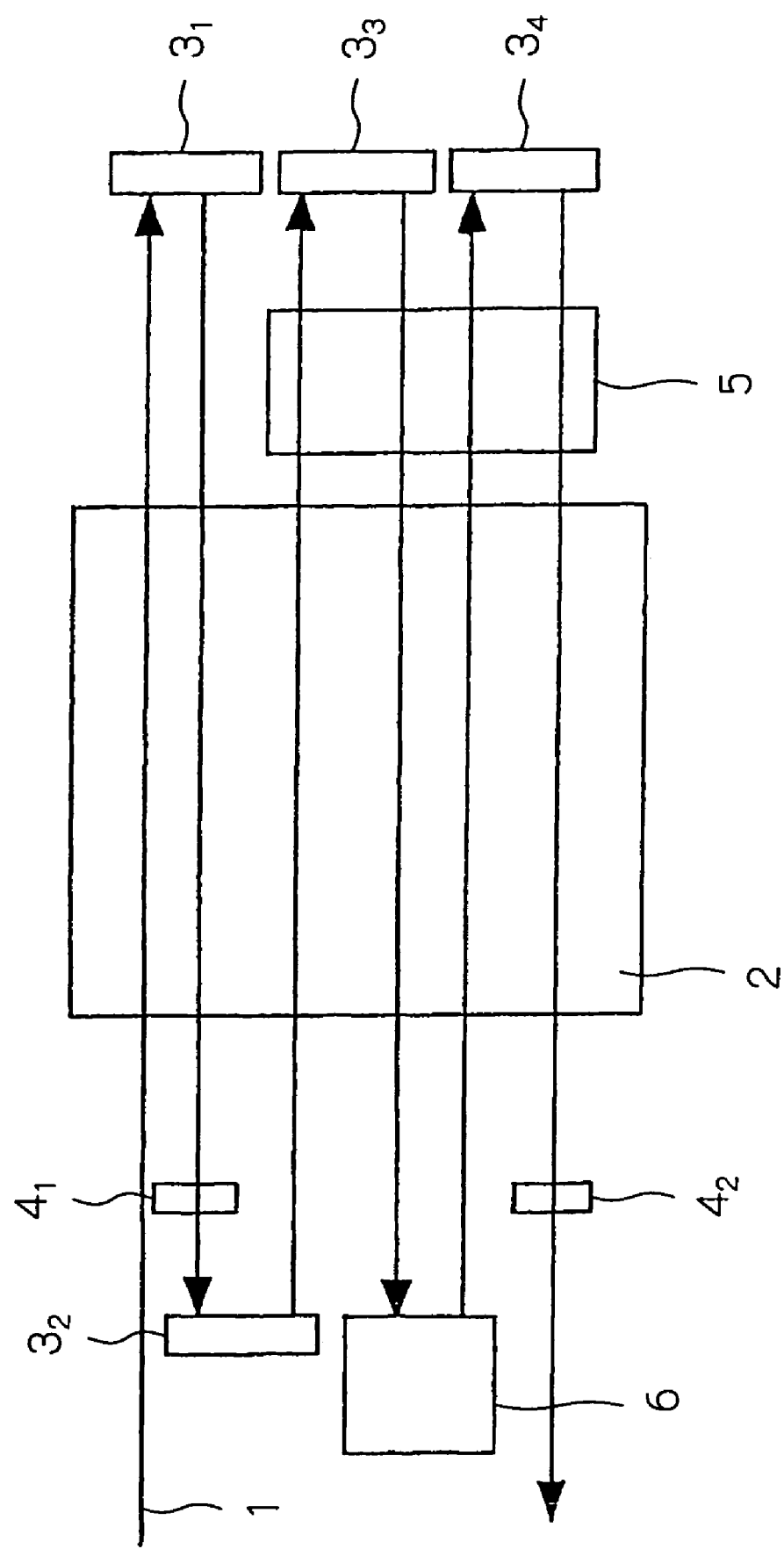
FIG. 4 shows schematically a method for amplifying a solid-state laser by a 6-pass system according to an embodiment of the present invention.

The method of amplifying a solid-state laser in accordance with an embodiment of the present invention is described below with reference to accompanying figures. FIG. 4 shows schematically the method for amplifying a solid-state laser by a 6-pass system according to an embodiment of the present invention. The configuration shown in FIG. 4 adds the following components to the conventional configuration shown in FIG. 1: four bending mirrors $3_1$-$3_4$ which ensure that the laser beam 1 is passed through the amplifier 2 multiple times and with spatial uniformity; two polarizers $4_1$ and $4_2$ from which an output laser beam is picked up; as well as a Faraday rotator 5 and a phase conjugate mirror 6 which compensate for the thermal distortion of the laser beam 1, the rotator 5 rotating the state of polarization of the laser beam 1 and the conjugate mirror 6 compensating for the distortion in the wavefront of the laser beam 1.

The incident laser beam 1 makes one pass through the amplifier 2 and is thereafter reflected by the first bending mirror $3_1$ to make the second pass. The reflected laser beam is picked up by the first polarizer $4_1$ and its spatial form is shaped. Thereafter, the incident laser beam is reflected by the second, third and fourth bending mirrors $3_2$-$3_4$ and by the phase conjugate mirror 6 so that it makes four passes through the amplifier 2 and the Faraday rotator 5. The amplified laser beam 1 is picked up from the second polarizer $4_2$ which utilizes the rotation of polarization. As a result, the laser beam 1 can make a total of six travels through the amplifier without sacrificing spatial uniformity. In this way, the energy stored in the amplifier 2 is sufficiently extracted to enable efficient amplification of the incident laser beam.

In addition, the thermal distortion in the laser beam that is caused by thermal birefringence (upsetting of the state of laser beam polarization on account of heat generation in the amplifier 2) is compensated by means of the Faraday rotator 5 and the thermal distortion in the laser beam that is caused by thermal lensing (the laser beam becomes no longer parallel and is subject to more-than-necessary focusing) is compensated by means of the phase conjugate mirror 6. As a result, a laser beam of high quality can be outputted featuring good focusing performance.

In the present invention, the laser beam passing through the amplifier may travel in a straight optical path as shown in FIG. 6(a) or in a zigzag path as shown in FIG. 6(b).

EXAMPLES

The following actual examples of experiment are provided for illustrating the present invention in a more specific way. The experimental setup was as shown schematically in FIG. 4. The incident laser beam was emitted from a semiconductor laser (LD) pumped, single-longitudinal-transverse-mode Nd:YAG laser, which is characterized by providing a maximum output energy of 0.25 mJ per pulse at an emission wavelength of 1064 nm for a pulse duration of 50 ns (FWHM) at a pulse repetition rate of 1 kHz, with the laser oscillating on the mode of linear polarization. The amplifier was of a side-pumped, zigzag slab type. The solid-state lasing material was a Nd:YAG crystal and the pumping light source was a LD. The Nd:YAG crystal measured 5 mm (thick)×32 mm (wide)×246 mm (long) and both the input and output faces of the crystal were antireflection coated at 1064 nm. As the pumping light source, two LDs were used that oscillated to provide a maximum output energy of 1.8 J per pulse at an emission wavelength of 808 nm at a pulse repetition rate of 1 kHz for a pulse duration of 200 μs.

Figure 5:
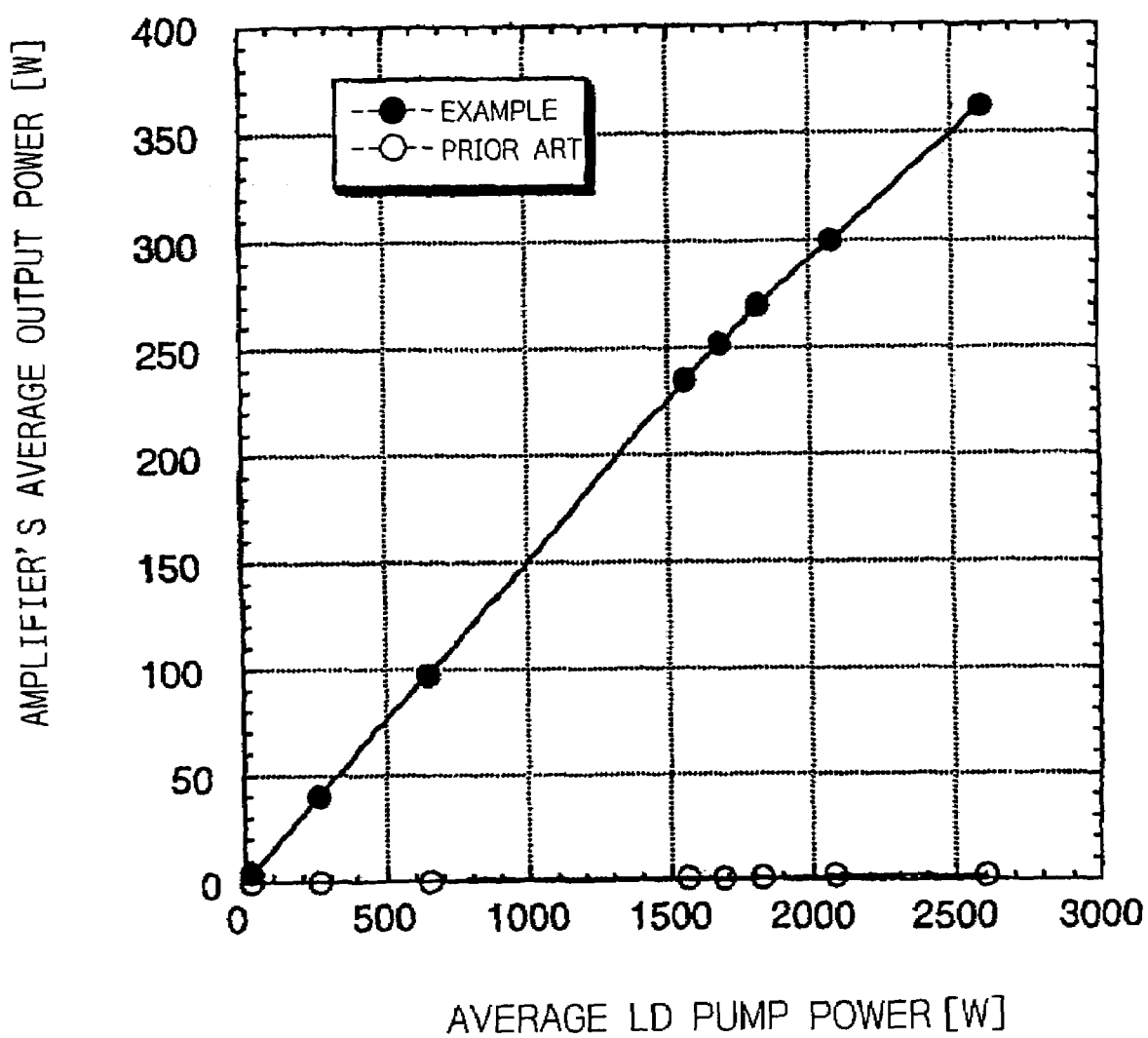
FIG. 5 is a graph showing the amplifier's average output power as a function of the average LD pump power in an example of the present invention as compared with the prior art.

FIG. 5 is a graph showing the amplifier's average output power as a function of the average LD pump power in two experiments, one being conducted as in the prior art by making a single pass of laser beam through the amplifier (the results are indicated by open circles) and the other being the example of the invention in which the laser beam was passed six times through the amplifier with the thermal distortion being compensated (the results are indicated by dots). By employing the amplification method according to the example, the output characteristics of the amplifier were improved, demonstrating the utility of the amplification method of the invention. The amplifier achieved a gain as high as about 1500. The quality of the output laser beam was nearly approaching the theoretical limit.

What is claimed is:

1. A method of amplifying a solid-state laser characterized in that a second bending mirror, a first polarizer, a second polarizer and a phase conjugate mirror are provided on the side of an amplifier which faces a laser oscillator, and a Faraday rotator, a first bending mirror, a third bending mirror and a fourth bending mirror are provided on the opposite side of the amplifier, wherein a laser beam of the oscillator is passed through the amplifier to be reflected by the first bending mirror, the reflected laser beam is passed through the amplifier and the first polarizer to be reflected by the second bending mirror, the reflected laser beam is passed through the amplifier and the Faraday rotator to be reflected by the third bending mirror, the reflected laser beam is passed through the rotator and the amplifier by the phase conjugate mirror, the reflected laser beam is passed through the amplifier and the rotator to be reflected by the fourth bending mirror, and the reflected laser beam is passed through the rotator to be reflected to be picked up from the second polarizer; and whereby the rotator and the phase conjugate mirror effectively compensate for thermal distortion of the laser beam caused by heat generation in the amplifier to obtain a laser beam of high quality that features good focusing performance.

2. The method of amplifying a solid-state laser according to claim 1, wherein the solid-state lasing material in the amplifier is a crystal, glass or ceramic, etc. that are doped with rare earth ion and the pumping light source is a semiconductor laser, a flash lamp, etc.

3. The method of amplifying a solid-state laser of claim 1, wherein the amplifier is of a zigzag of slab type which allows for a larger cooling surface and, hence, a greater energy stored per unit length and which provides an amplified laser beam of uniform gain with reduced thermal distortion.

4. The method of amplifying a solid-state laser of claim 2, wherein the amplifier is of a zigzag slab type which allows for a larger cooling surface and, hence, a greater energy stored per unit length and which provides an amplified laser beam of uniform gain with reduced thermal distortion.

5. A method for amplifying a solid-state laser comprising:
passing a laser beam from a laser oscillator through an amplifier having a side facing the oscillator and an opposite side to be reflected by a first bending mirror on the opposite side to form a reflected beam;
passing the reflected beam through the amplifier and a first polarizer on the side of the amplifier that faces the laser oscillator to be reflected by a second bending mirror on the side of the amplifier facing the oscillator to form a second reflected beam;
passing the second reflected beam through the amplifier and a Faraday rotator on the opposite side to be reflected by a third bending mirror on the opposite side to form a third reflected beam;
passing the third reflected beam through the rotator and the amplifier to be reflected by a phase conjugate mirror on the side of the amplifier facing the oscillator, then through both the amplifier and the rotator again, to be reflected by a fourth bending mirror on the opposite side to form a fourth reflected beam; and
passing the fourth reflected beam through the rotator and the amplifier to be picked up from a second polarizer on the side of the amplifier facing the oscillator;
wherein the rotator and the phase conjugate mirror effectively compensate for thermal distortion of the laser beam caused by heat generation in the amplifier to obtain an amplified, high quality, high output power, focused laser beam.

6. The method of amplifying a solid-state laser of claim 5, wherein the solid-state lasing material in the amplifier is a crystal, glass or ceramic, etc. doped with a rare earth ion and the pumping light source is a semiconductor laser, a flash lamp, etc.

7. The method of amplifying a solid-state laser of claim 5, wherein the amplifier is of zigzag slab type which allows for a larger cooling surface and, hence a greater energy stored per unit length and which provides an amplified laser beam of uniform gain with reduced thermal distortion.

8. The method of amplifying a solid-state laser of claim 6, wherein the amplifier is of zigzag slab type which allows for a larger cooling surface and, hence, a greater energy stored per unit length and which provides an amplified laser beam of uniform gain with reduced thermal distortion.

* * * * *